United States Patent
Amamiya et al.

(10) Patent No.: US 7,014,255 B2
(45) Date of Patent: Mar. 21, 2006

(54) INDUSTRIAL VEHICLE

(75) Inventors: Yoshiyuki Amamiya, Kariya (JP); Kazushi Kamiya, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/402,521

(22) Filed: Mar. 28, 2003

(65) Prior Publication Data

US 2003/0184123 A1  Oct. 2, 2003

(30) Foreign Application Priority Data

Apr. 1, 2002 (JP) .......................... P2002-098931

(51) Int. Cl.
*B62D 1/02* (2006.01)
*B60K 26/00* (2006.01)

(52) U.S. Cl. .................. 296/190.08; 296/190.01; 297/115; 297/411.35; 180/329

(58) Field of Classification Search .......... 296/190.04, 296/190.05, 190.06, 190.07, 190.08, 190.01; 297/115, 411.35; 180/89.12, 324, 326, 329
See application file for complete search history.

(56) References Cited

U.S. PATENT DOCUMENTS

| | | | |
|---|---|---|---|
| 4,097,085 A * | 6/1978 | Nelson .................. 296/190.05 |
| 4,120,375 A * | 10/1978 | Shinoda et al. .......... 180/89.14 |
| 4,200,166 A * | 4/1980 | Hansen ..................... 180/315 |
| 4,244,623 A * | 1/1981 | Hall et al. ............. 297/411.36 |
| 4,311,205 A * | 1/1982 | Goodacre et al. .......... 180/68.5 |
| 4,312,418 A * | 1/1982 | Rittman ................... 180/69.21 |
| 4,702,520 A * | 10/1987 | Whisler et al. ........ 297/411.36 |
| 5,409,080 A * | 4/1995 | Templeton et al. ......... 180/326 |
| 5,566,778 A * | 10/1996 | Valier et al. ............... 180/334 |
| 5,567,004 A * | 10/1996 | Pietzsch ..................... 180/326 |
| 5,924,515 A * | 7/1999 | Stauffer ...................... 180/326 |
| 5,938,282 A * | 8/1999 | Epple ..................... 297/217.3 |
| 5,941,603 A | 8/1999 | Wein ..................... 297/411.35 |
| 6,039,141 A * | 3/2000 | Denny ......................... 180/329 |
| 6,164,285 A * | 12/2000 | Garberg et al. ............. 180/326 |
| 6,276,749 B1 * | 8/2001 | Okazawa et al. ....... 296/190.08 |
| 6,357,820 B1 * | 3/2002 | Nagatsuka et al. ..... 296/190.06 |
| 6,612,636 B1 * | 9/2003 | Arthur et al. ................. 296/71 |
| 6,634,453 B1 * | 10/2003 | Arthur et al. ................ 180/315 |

FOREIGN PATENT DOCUMENTS

DE  35 45 334  * 7/1987
JP  61-139565  * 6/1986

* cited by examiner

*Primary Examiner*—Joseph D. Pape
(74) *Attorney, Agent, or Firm*—Morgan & Finnegan, LLP

(57) ABSTRACT

An industrial vehicle has a body, a hood and an armrest. The hood is installed on or above the body and has an end. The end is a pivotal axis around which the hood is pivoted so that the hood is opened and closed to the body. The armrest is installed on or above the hood. The armrest has a pivotal axis around which the armrest is pivoted relative to the hood. The armrest has a first position and a second position and is displaced between the first position and the second position.

14 Claims, 19 Drawing Sheets

INDUSTRIAL VEHICLE

BACKGROUND OF THE INVENTION

The present invention relates to an industrial vehicle such as a forklift truck and more particularly to the industrial vehicle with which a hood is provided, the hood being opened and closed around an end of the hood that functions as a pivotal axis, a seat and an armrest being provided on or above the hood.

To supply an operator of the forklift truck with a comfortable working environment by reducing fatigue of the operator, such a forklift truck that is provided with an armrest at one side of the seat (at a right side in many cases) is proposed. In the forklift truck, the seat and the armrest for the operator are placed on the hood that covers a battery or an engine. To provide the battery or the engine with service, the hood is structured so as to be opened rearward around the rear end of the hood functioning as a pivotal axis. In such a structure, when the hood is pivoted rearward around the rear end thereof to be opened, if the armrest is arranged so as to protrude more forward than the front end surface of the hood, it is possible that the armrest interferes with a head guard for protecting the operator. Therefore, to prevent the armrest from interfering with the head guard, it is preferred that the armrest is structured so as to vary its position for installing the armrest relative to the hood.

U.S. Pat. No. 5,941,603 discloses such a structure that an armrest is installed in a vehicle seat so as to be capable of adjusting a position thereof. This armrest according to the Patent is installed in the vehicle seat through a parallel linkage. In this case, the armrest is movable between an upper position at the front side and a lower position at the rear side so as to maintain a parallel state.

When the structure of the armrest provided with the parallel linkage is adopted, the structure of the armrest becomes complicated and furthermore it is hard to secure a relatively large displacement of the armrest. Therefore, the structure of the armrest provided with the parallel linkage is not necessarily suitable as a structure for installing the armrest in the hood for the industrial vehicle.

SUMMARY OF THE INVENTION

The present invention is directed to an industrial vehicle that has an armrest on a hood of the industrial vehicle where the armrest is structurally simple but also effectively installed in the hood so as to avoid interfering with other parts installed on the industrial vehicle when the hood is opened.

The present invention has a following feature. An industrial vehicle has a body, a hood and an armrest. The hood is installed on or above the body and has an end. The end is a pivotal axis around which the hood is pivoted so that the hood is opened and closed to the body. The armrest is installed on or above the hood. The armrest has a pivotal axis around which the armrest is pivoted relative to the hood. The armrest has a first position and a second position and is displaced between the first position and the second position.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

An industrial vehicle according to a first preferred embodiment of the present invention will now be described with reference to FIGS. 1 through 6. In the first embodiment, a forklift truck is adopted as the industrial vehicle.

Figure 1:
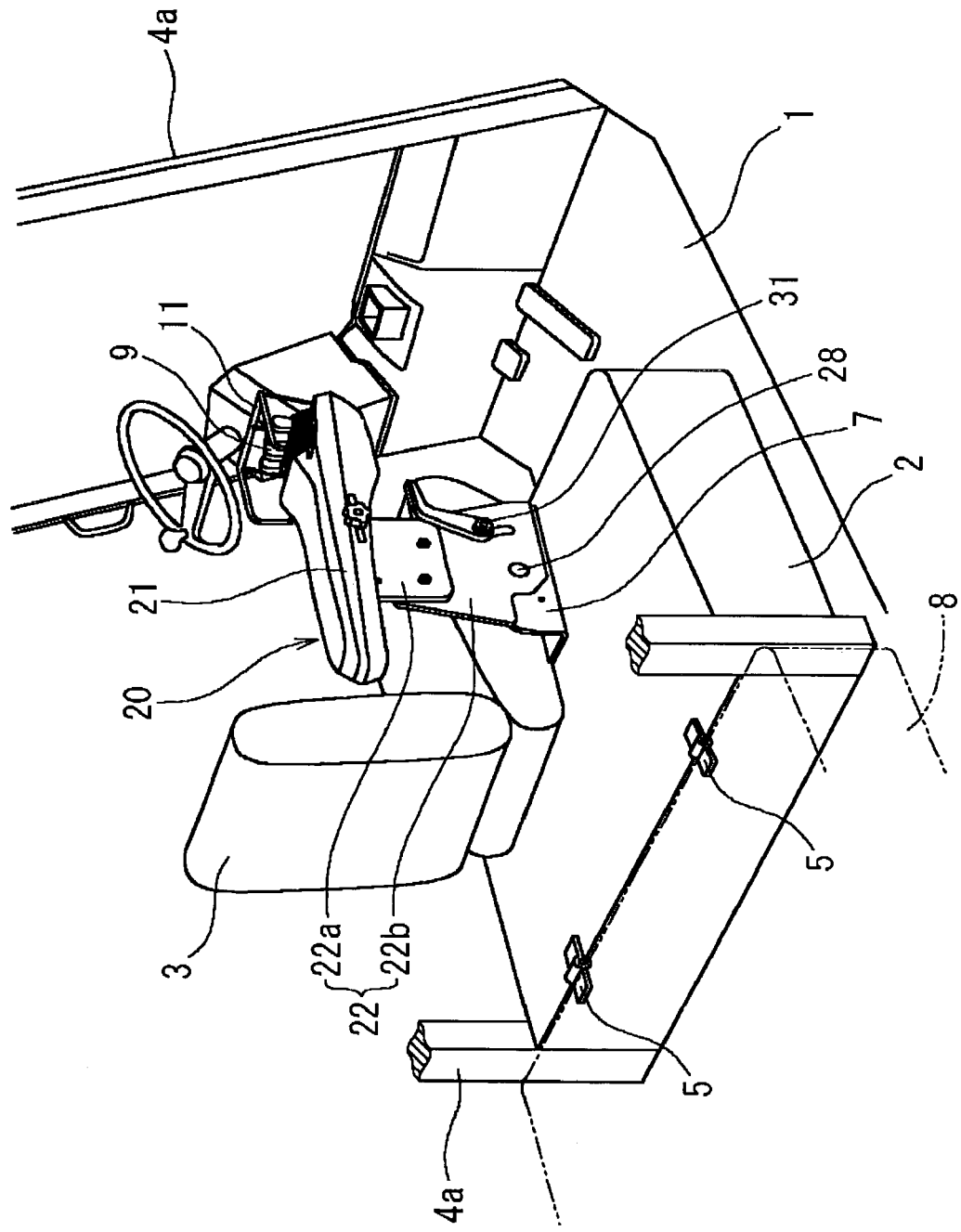
FIG. 1 is a partial perspective view illustrating a forklift truck according to a first preferred embodiment of the present invention.
Figure 2:
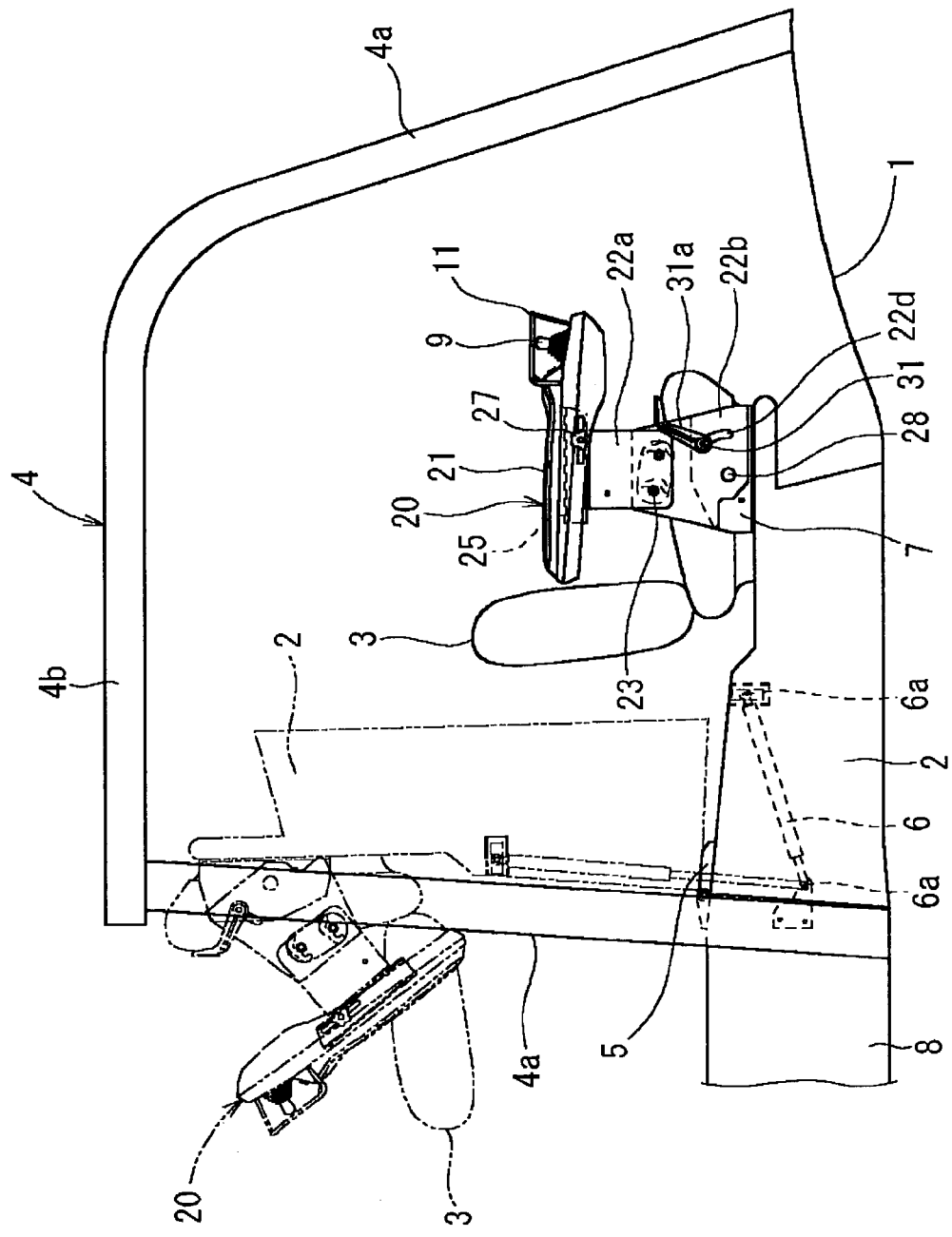
FIG. 2 is a side view illustrating an opening and closing action of a hood according to the first preferred embodiment of the present invention.

As shown in FIGS. 1 and 2, a hood 2 is placed on a body 1 of the forklift truck for covering a battery or an engine. A seat 3 is placed on the hood 2 and an armrest 20 is placed above the hood 2. An operator sits on the seat 3 and rests his arm on the armrest 20. A head guard 4 is placed on the body 1 for guarding the operator against falling objects. The head guard 4 includes four pillars 4a and a guard portion 4b. The pillars 4a are erected on the body 1 to support the guard portion 4b. A counterweight 8 is installed on the rear side of the body 1. The rear end of the hood 2 is installed on the front end of the counterweight 8 through a hinge 5 in such a manner that the hood 2 pivots on the hinge 5 in a front-and-rear direction of the body 1. Thus, the hood 2 is opened and closed to the body 1. In this case, a pivotal fulcrum of the hood 2 corresponds to a pivotal axis of the hood 2.

Referring to FIG. 2, the shock of the body 1 caused by an opening and closing action of the hood 2 is absorbed by two shock absorbers 6 each provided at right and left sides. One end of each shock absorber 6 is pivotally connected to the pillar 4a at the rear side of the body 1 by an associated pin 6a. The other end thereof is pivotally connected to the side surface of the hood 2 by another associated pin 6a. The seat 3 is fixed to the upper surface of the hood 2 by a bolt which is not shown in the drawings. The armrest 20 is placed on the right side of the seat 3 in parallel with the seat 3. A bracket 7 or a support member is erected on the upper surface of the hood 2 for supporting the armrest 20.

Now referring to FIGS. 3 through 6, the structure of the armrest 20 and the structure for installing the armrest 20 on the bracket 7 will be described. The armrest 20 includes an armrest body 21 and an oblong plate 22. The armrest body 21 extends in the front-and-rear direction and has a substantially horizontal plane for resting the operator's arm. The plate 22 installs the armrest body 21 on the bracket 7.

The armrest body 21 is formed in the shape of box and is substantially in a rectangular shape in a plane view. A plurality of operating members 9 is placed on the front end of the armrest body 21 for operating an actuator for loading operation such as a lift cylinder and a tilt cylinder. The operating members 9 include a lift lever for raising and lowering a fork, a tilt lever for tilting a mast frontward and rearward, and an attachment lever for operating an attachment attached to a loading device. These levers are placed in a lateral direction of the armrest body 21. Also, a guard 11 is formed on the front end of the armrest body 21 so as to surround the operating members 9 and thus protects the operating members 9 from interfering with an obstacle.

Figure 3:
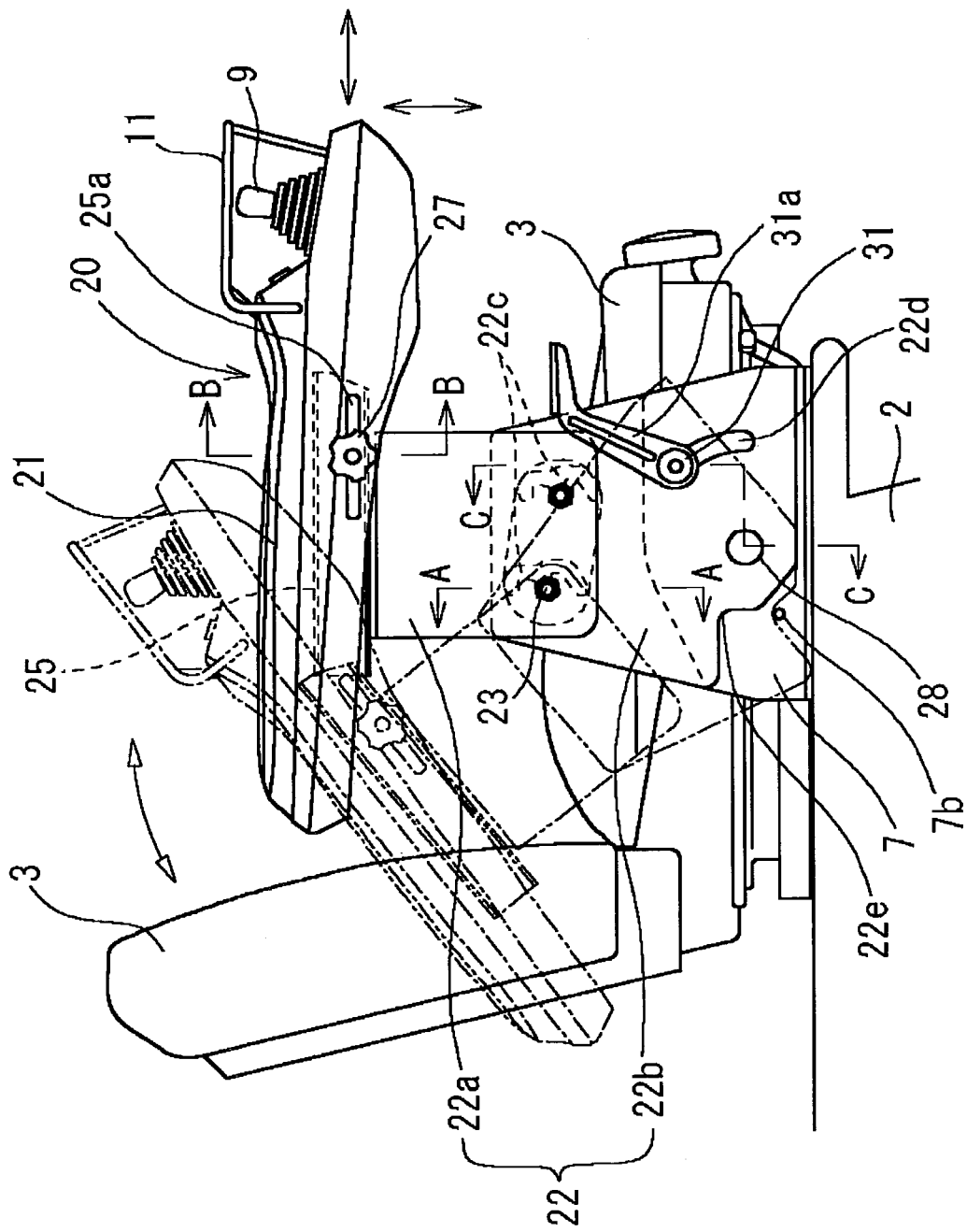
FIG. 3 is a side view illustrating a displacement of an armrest according to the first preferred embodiment of the present invention.
Figure 4:
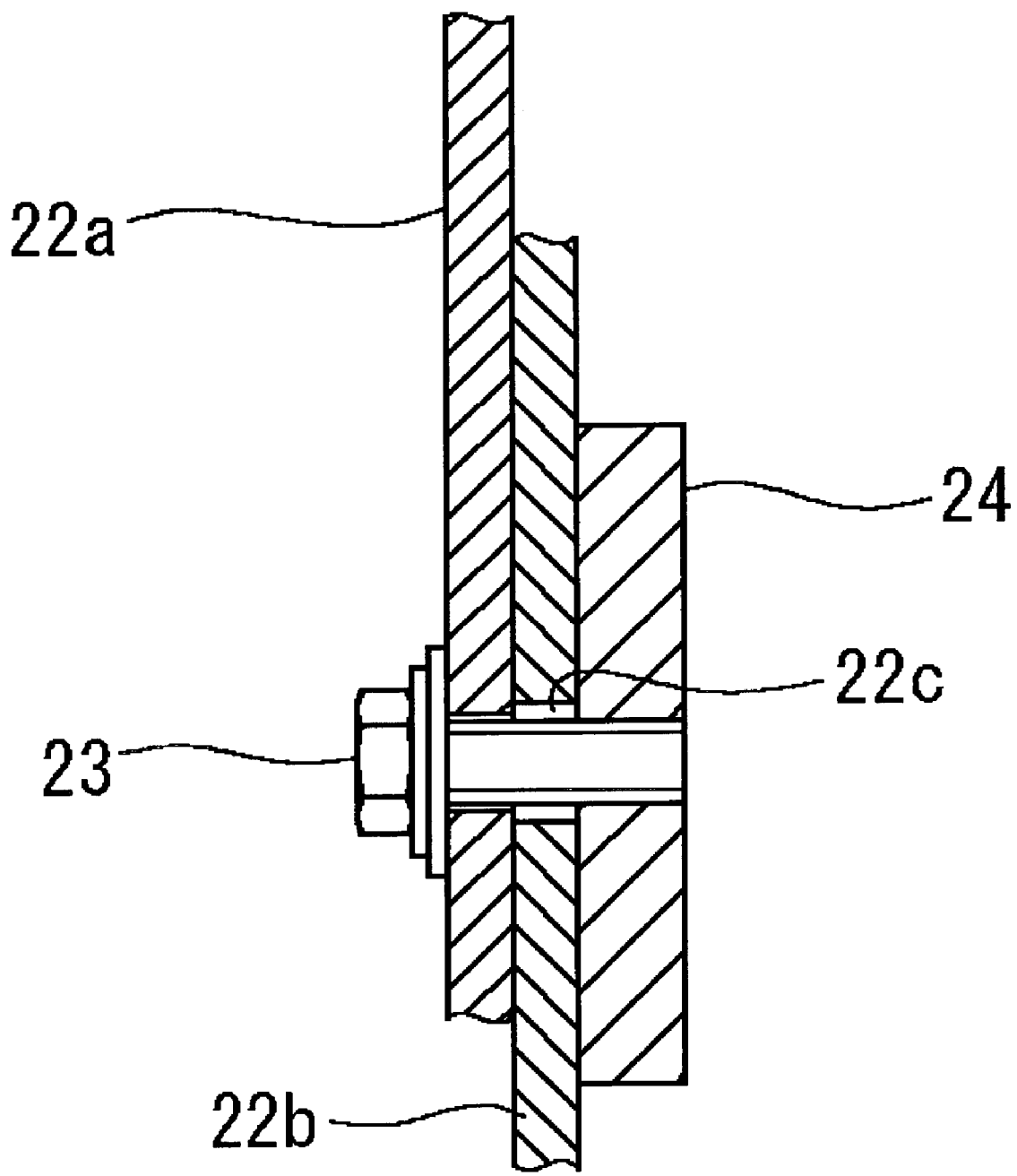
FIG. 4 is a cross-sectional view illustrating an upper plate, a lower plate, a screw and a nut that are taken along the line A—A in FIG. 3.

As shown in FIG. 3, the plate 22 of the armrest 20 includes an upper plate 22a and a lower plate 22b. The upper plate 22a is superimposed on the lower plate 22b. As shown in FIG. 4, the upper plate 22a and the lower plate 22b are tightened by two screws 23 and a nut 24 in the shape of plate. A slot 22c substantially in the shape of E is formed in the lower plate 22b. Therefore, the position of the upper plate 22a is adjusted to three heights by loosing the screw 23 and by moving the screw 23 along the slot 22c.

Figure 5:
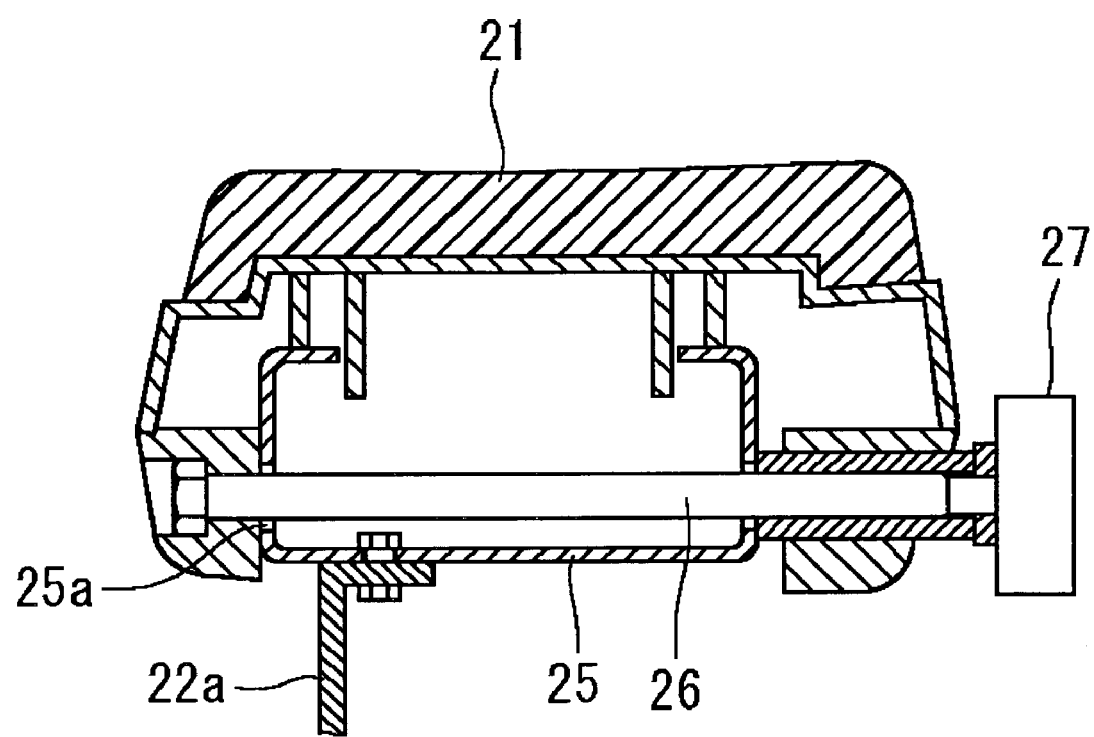
FIG. 5 is a cross-sectional view illustrating an armrest body and a slide guide that are taken along the line B—B in FIG. 3.

As shown in FIG. 5, a slide guide 25 whose cross sectional shape is substantially rectangular is fixed on the upper end of the upper plate 22a. The slide guide 25 extends in the front-and-rear direction. The armrest body 21 is placed over the slide guide 25 and supported by the slide guide 25 so as to move in the front-and-rear direction. A slot 25a is formed on the slide guide 25 and extends in the front-and-rear direction. A through bolt 26 is inserted into the slot 25a of the slide guide 25 through a hole formed in the armrest body 21. The armrest body 21 is fixed to the slide guide 25 by tightening a knob 27 that is installed on one end of the through bolt 26. Therefore, when the knob 27 is loosened, the position of the armrest body 21 is adjusted in the front-and-rear direction. Thus, the position of the armrest body 21 is properly adjusted so as to meet the operator's physique.

Figure 6:
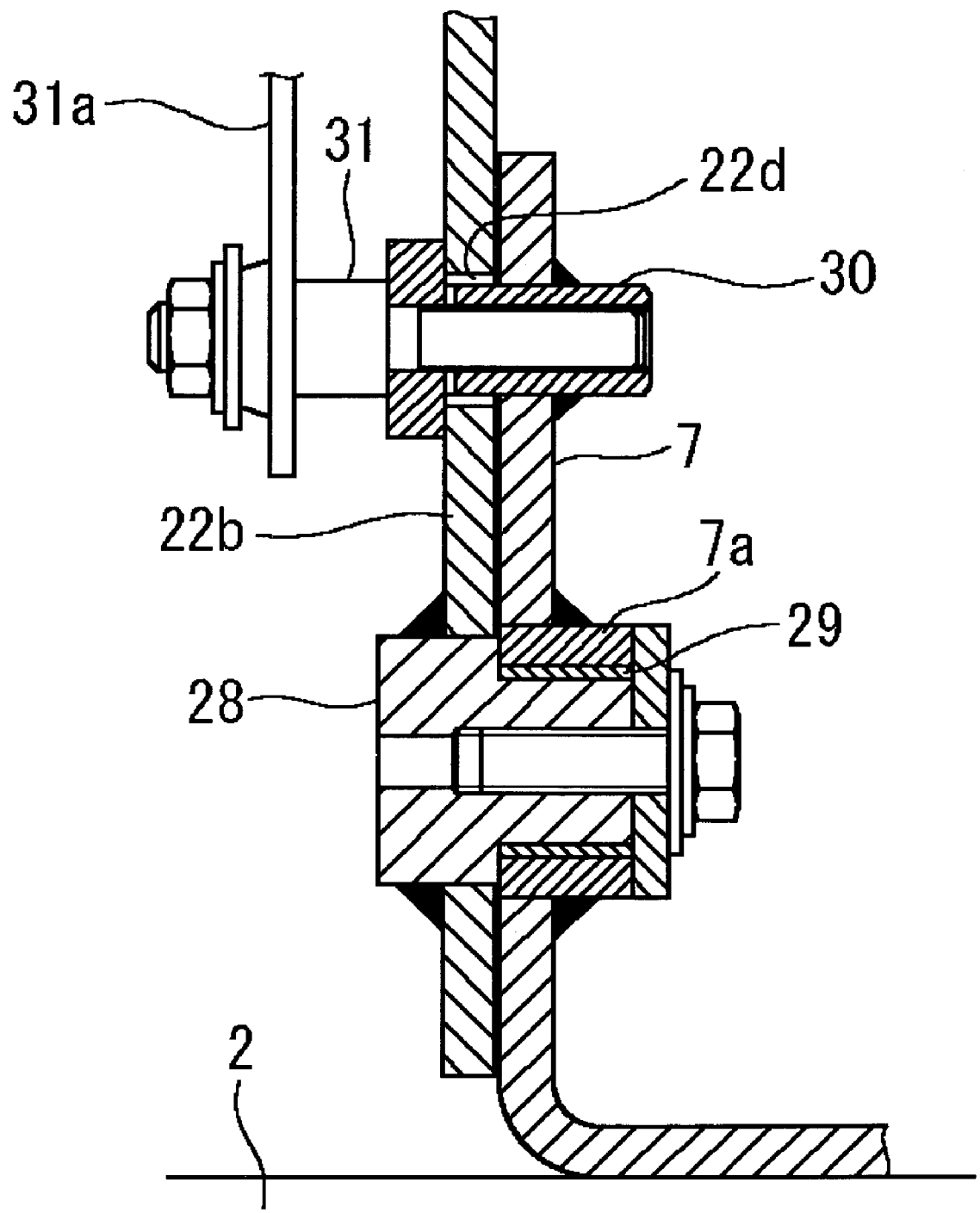
FIG. 6 is a cross-sectional view illustrating a lower plate, a bracket, a pin, a screw and a pivotal shaft that are taken along the line C—C in FIG. 3.

Now, the structure for installing the armrest 20 on the bracket 7 will be described. As shown in FIGS. 3 and 6, the lower end of the lower plate 22b is installed on the bracket 7 through a pivotal shaft 28 so as to pivot in the front-and-rear direction. More specifically, the armrest 20 is pivotally installed on the bracket 7 and the pivotal center is set at a lower part of the armrest 20 and substantially midway in the front-and-rear direction of the armrest 20. In this case, the above-mentioned pivotal center corresponds to the pivotal axis of the armrest 20. As shown in FIG. 6, a cylinder 7a is fixed to the bracket 7 and a bushing 29 is accommodated in the cylinder 7a so as to slide over the cylinder 7a. The pivotal shaft 28 is supported by the bushing 29 so as to slide over the bushing 29 and thus is smoothly pivoted.

An arched slot 22d whose center of the curvature is a pivotal fulcrum of the lower plate 22b is formed on the lower plate 22b. A pin 30 is fixed to the bracket 7 to function as a nut. The pin 30 is inserted in the slot 22d so as to move along the slot 22d relative to the lower plate 22b. A screw 31 is screwed into a tapped hole of the pin 30 and a handle 31a is fixed on the screw 31. By fastening the screw 31 to the pin 30, the lower plate 22b is fixed to the bracket 7. Therefore, in a state that the screw 31 is loosened to the pin 30, it is possible to pivot the armrest 20 in the front-and-rear direction. At this time, the pin 30 moves along the slot 22d. The above-mentioned screw 31 having the handle 31a constitutes a means for fixing the armrest 20.

The position where the armrest 20 is installed relative to the hood 2 is displaced by pivoting the pivotal shaft 28 as the pivotal fulcrum in the front-and-rear direction. When the pivotal shaft 28 is pivoted frontward, the armrest body 21 is substantially in a horizontal state and the front end of the armrest body 21 protrudes more frontward than the front end surface of the hood 2. At this time, the position is a using position (illustrated by a solid line in FIG. 3) that is supplied to a use of the operator and corresponds to a first position. If the hood 2 is opened in a state that the armrest 20 is at the using position, the front end of the armrest 21 interferes with or contacts the guard portion 4b of the head guard 4.

On the other hand, when the pivotal shaft 28 is pivoted rearward, the front end of the armrest body 21 is positioned more rearward than the front end surface of the hood 2. This position is an evacuating position (illustrated by a two-dot chain line in FIG. 3) and corresponds to a second position. Note that when the armrest 20 is pivoted toward the using position, the pivotal range of the armrest 20 is regulated since the pin 30 contacts one end of the slot 22d. In contrast, when the armrest 20 is pivoted toward the evacuating position, the pivotal range of the armrest 20 is regulated since an engaging portion 22e formed on the lower plate 22b contacts a stopper pin 7b formed on the bracket 7.

As constituted above, in the first embodiment, when the hood 2 is opened by hand to provide a battery or an engine with service, before the hood 2 is opened, as illustrated by the two-dot chain line in FIG. 3, if the armrest 20 is displaced to the evacuating position by loosing the screw 31 with the handle 31a and then by pivoting the armrest 20 around the pivotal shaft 28 rearward, the armrest 20 is moved so as to approach the pivotal center of the hood 2 and the front end of the armrest 20 is moved more rearward than the front end surface of the hood 2. In this state, since the position of the center of gravity of the armrest 20 is moved rearward than the vertical line that passes through the pivotal shaft 28, it is not necessary to fix the armrest 20 at the evacuating position by fastening the screw 31 to the pin 30 with the handle 31a. Then, when the hood 2 is pivoted rearward or upward, since the armrest 20 is positioned in a trajectory that is drawn by pivoting the hood 2 around the hinge 5, the interference between the armrest 20 and the guard portion 4b of the head guard 4 is avoided. Also, the return of the armrest 20 to the using position is performed by operating the armrest 20 in the reverse order to the above-mentioned procedure after the hood 2 is closed.

As described above, in the first embodiment, when the hood 2 is opened, the interference between the head guard 4, which is originally placed as an obstacle in a trajectory that is drawn by movement of the armrest 20 connected to the hood 2, and the armrest 20 is avoided by displacing the armrest 20 to the evacuating position. In this case, since the armrest 20 is pivoted around a single pivotal shaft 28, the structure of the armrest 20 is simplified as compared to the structure for installing the armrest 20 with a link mechanism.

Also, in the first embodiment, the levers functioning as the operating members 9 are formed on the armrest 20. Therefore, the operator can comfortably operate the levers with the operator's arm rested on the upper surface of the armrest body 21. Thereby, the fatigue of the operator is reduced. Since the operating members 9 are surrounded by the guard 11, the guard 11 prevents the operator from unintentionally operating the operating members 9 with the operator's arm rested on the armrest 20. Furthermore, when the hood 2 is opened, even if the hood 2 is opened in a state that the armrest 20 is not moved to the evacuating position, the guard 11 contacts the guard portion 4b of the head guard 4. Thereby, the operating members 9 are protected.

An industrial vehicle according to a second preferred embodiment of the present invention will now be described with reference to FIGS. 7 and 8. In the second embodiment, as for the installing structure of the armrest 20 in the first embodiment, a link 35 is arranged. Thereby, the armrest 20 is displaced between the using position and the evacuating position in connection with an opening and closing action of the hood 2. The link 35 corresponds to an interlocking member. In the other aspects, a forklift truck according to the second embodiment of the present invention is structurally same as the forklift truck according to the first embodiment of the present invention. Therefore, constituent components common to the first embodiment are added with the same reference numeral on the drawings and overlap of explanation is omitted.

Figure 7:
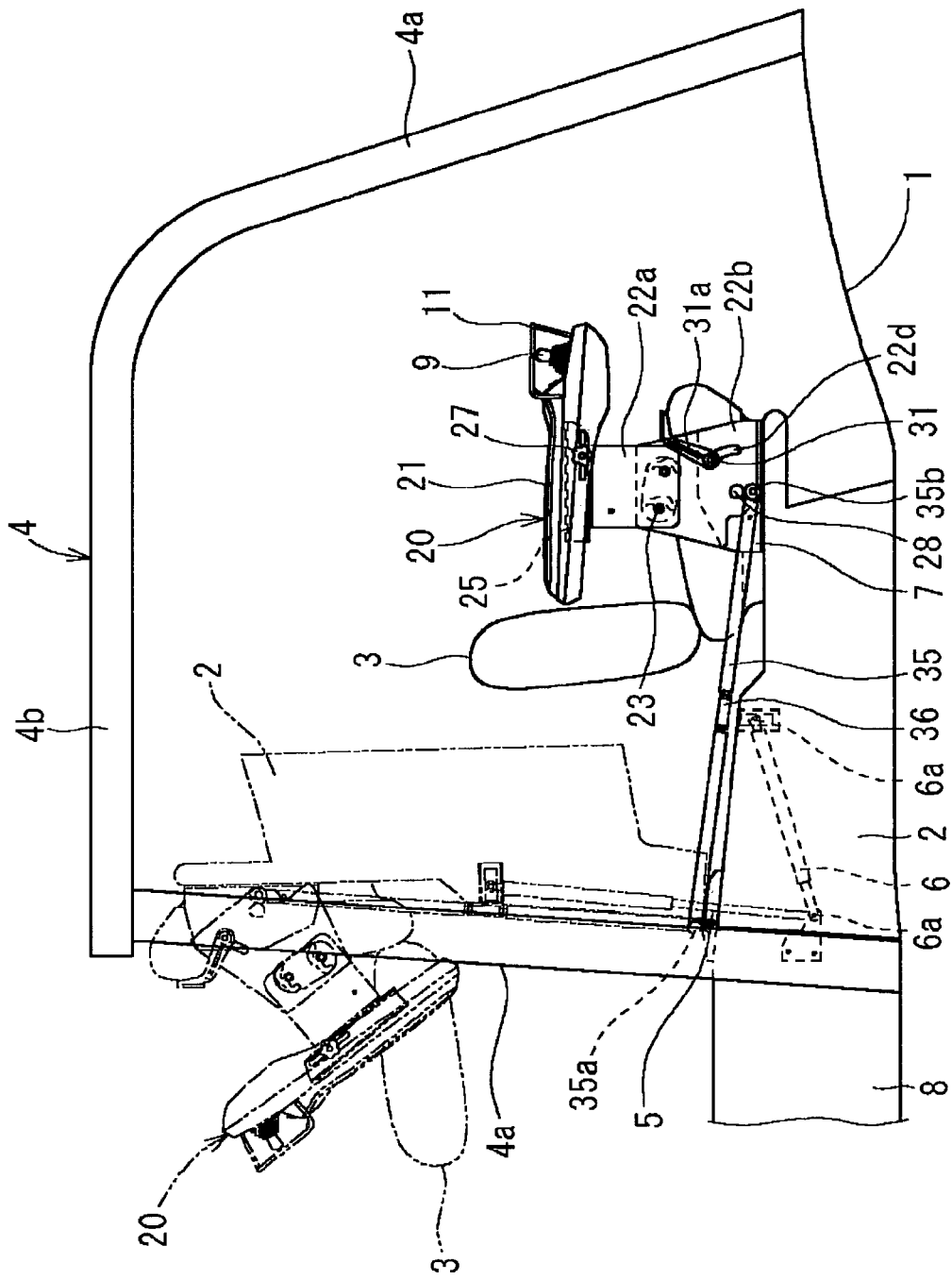
FIG. 7 is a side view illustrating a structure for installing an armrest according to a second preferred embodiment of the present invention.

As shown in FIG. 7, the link 35 is arranged to some extent above the side surface of the hood 2 so as to extend in the front-and-rear direction. One end of the link 35 is pivotally connected to the pillar 4a at the rear side of the body 1 by a pin 35a while the other end of the link 35 is pivotally connected to the lower plate 22b of the armrest 20 by a pin 35b. A connecting point at the side of the rear pillar 4a of the link 35 or the pin 35a is positioned to some extent above the hinge 5 that is a pivotal fulcrum of the hood 2. A connecting point at the side of the armrest 20 or the pin 35b is positioned to some extent beneath the pivotal shaft 28 that is a pivotal fulcrum of the armrest 20.

Figure 8:
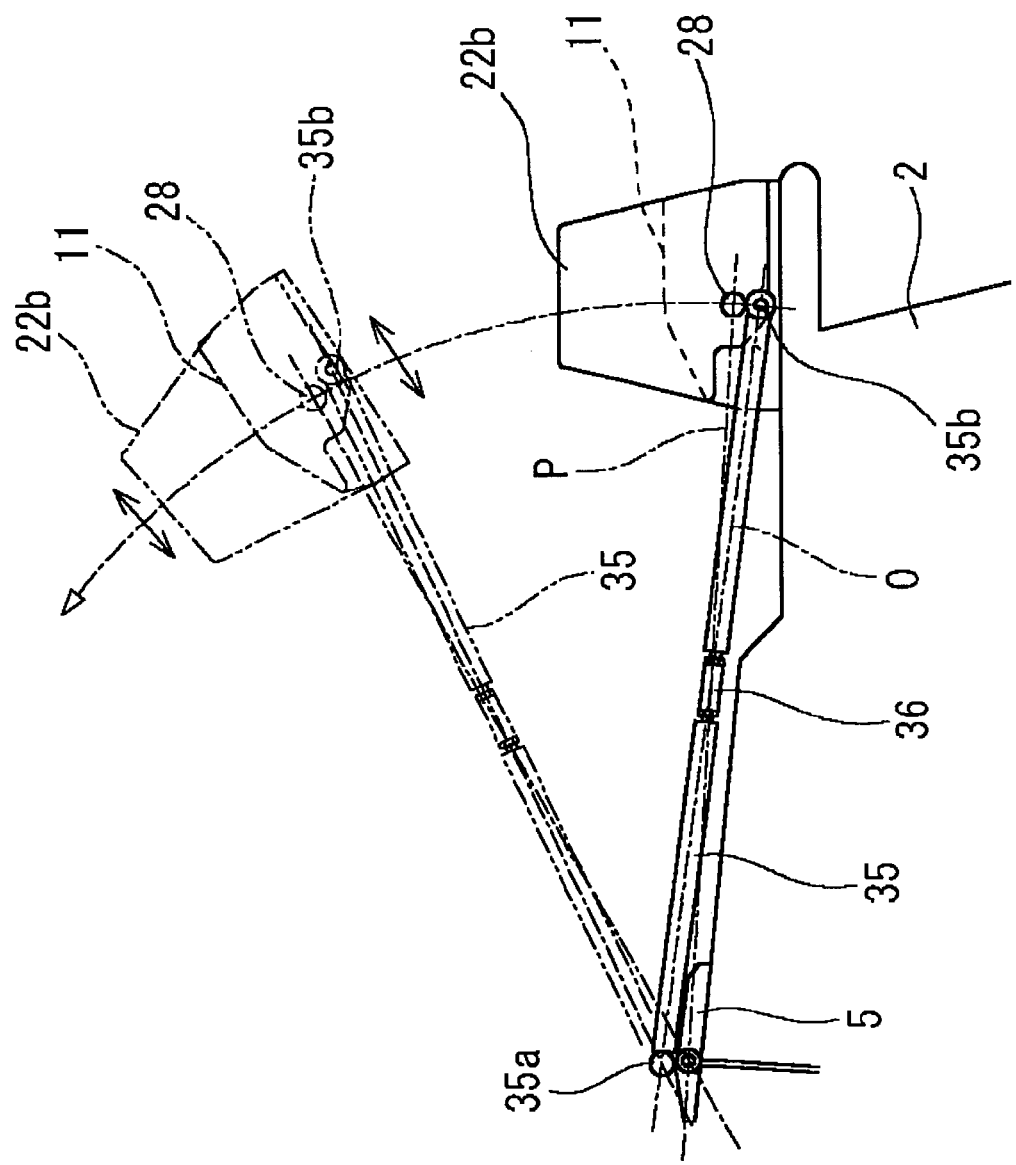
FIG. 8 is a partial enlarged view illustrating an action of a link according to the second preferred embodiment of the present invention.

More specifically, as shown in FIG. 8, each connecting point of the link 35 to the rear pillar 4a and the armrest 20 is set in such a manner that a dot chain line O that links the both connecting points, and a dot chain line P that links the pivotal fulcrum of the hood 2 with the pivotal fulcrum of the armrest 20 intersect with each other. A turnbuckle 36 is provided with the link 35 for adjusting the length of the link 35 halfway in a longitudinal direction of the link 35. Therefore, when the link 35 is installed on the rear pillar 4a or the armrest 20, unevenness of a connecting position caused by an error of the manufacture of the link 35 is cancelled.

As constituted above, in the second embodiment, before the hood 2 is opened, the screw 31 provided with the handle 31a is loosened. Then, if the armrest 20 is opened by hand, as shown in FIG. 8, external force is applied to the armrest 20 through the link 35 so as to pivot the armrest 20 rearward. Thereby, the armrest 20 is pivoted around the pivotal shaft 28 rearward and displaced to the evacuating position. Also, when the hood 2 is closed, the armrest 20 is pivoted in a reverse direction and returned to the using position.

Thus, in the second embodiment, the armrest 20 is displaced between the using position and the evacuating position in connection with the opening and closing action of the hood 2, especially without displacing the armrest 20 by operating the armrest 20. Therefore, operating performance is improved. In the present embodiment, although it is not necessary to adopt the screw 31 provided with the handle 31a, the screw 31 is effective to prevent the armrest 20 from chattering.

Now, an industrial vehicle according to a third preferred embodiment of the present invention will be described with reference to FIGS. 9 through 19. In the third embodiment, as for a means for fixing the armrest 20, a locking mechanism 40 is adopted in place of the screw 31 provided with the handle 31a. In the other aspects, the forklift truck according to the third embodiment of the present invention is structurally same as the forklift truck according to the first embodiment of the present invention. Therefore, constituent components common to the first embodiment are added with the same reference numeral on the drawings and overlap of explanation is omitted.

Figure 9:
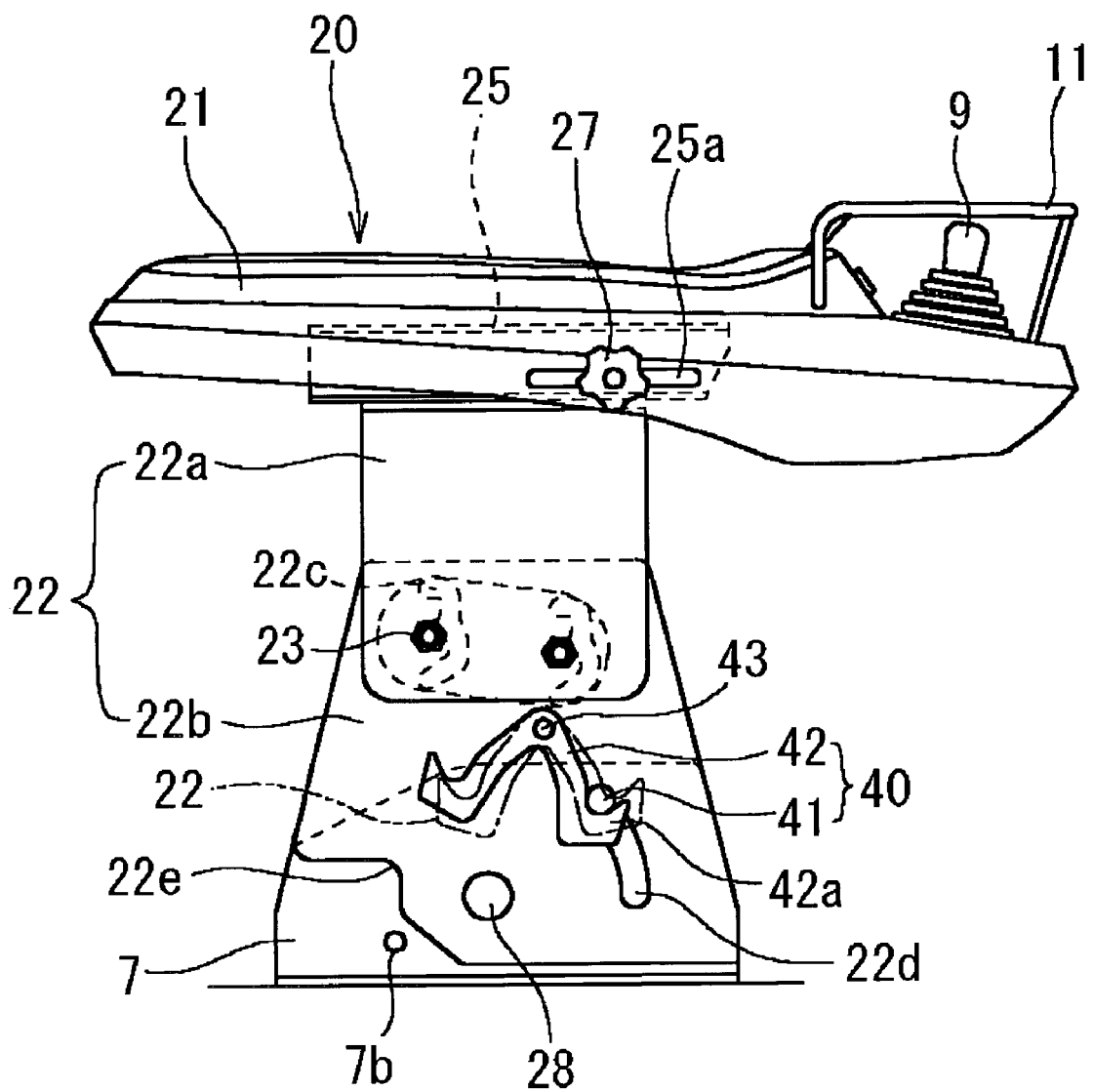
FIG. 9 is a side view illustrating a structure for installing an armrest according to a third preferred embodiment of the present invention.

As shown in FIG. 9, the locking mechanism 40 includes a locking pin 41 and a locking member 42. The locking pin 41 is fixed to the bracket 7 and the locking member 42 is installed on the lower plate 22b of the armrest 20. The locking member 42 is formed substantially in an angular shape and the top of the angular shape is pivotally supported by a shaft 43. Front and rear hooks 42a whose shape is in the shape of V are provided in the locking member 42 so as to sandwich the shaft 43 at the front and rear sides of the shaft 43 beneath the shaft 43, respectively. In other words, the locking member 42 is pivotally supported by the shaft 43 in the middle of the front-and-rear direction thereof. The shape at the front and rear sides of the locking member 42 is formed so as to be symmetrical with respect to the shaft 43. Therefore, in a free state, as shown by a two-dot chain line in FIG. 9, the weight at the front and rear sides of the locking member 42 is balanced and the locking member 42 is horizontal. On the other hand, the locking pin 41 extends through the arched slot 22d formed in the lower plate 22b and protrudes at the side of the locking member 42. Thereby, the locking pin 41 is movable relative to the lower plate 22b along the slot 22d. Note that the center of curvature of the arched slot 22d is the pivotal shaft 28.

When the armrest 20 is at the using position, the locking pin 41 engages with the front hook 42a and thereby locks the armrest 20 so as not to pivot rearward. In the locking state (or in the engaging state), the locking pin 41 holds the front hook 42a from the top of the front hook 42a and the locking member 42 is slightly pivoted rearward. In such a state, when the hood 2 is opened by hand, the locking member 42 is pivoted so as to unlock the locking pin 41 for its tare. Thereby, the armrest 20 is also tilted rearward by its tare. Now, the working of the locking mechanism 40 and the armrest 20 that is operated in connection with the opening and closing action of the hood 2 will be described with reference to FIGS. 10 through 19. Note that a dot chain line Q illustrated in FIGS. 10 through 19 is a central line that divides the locking member 42 into two parts at the front and rear sides. Also, in the locking state, the locking member 42 is tilted rearward relative to the direction of the action of gravity (downward direction).

Figure 10:
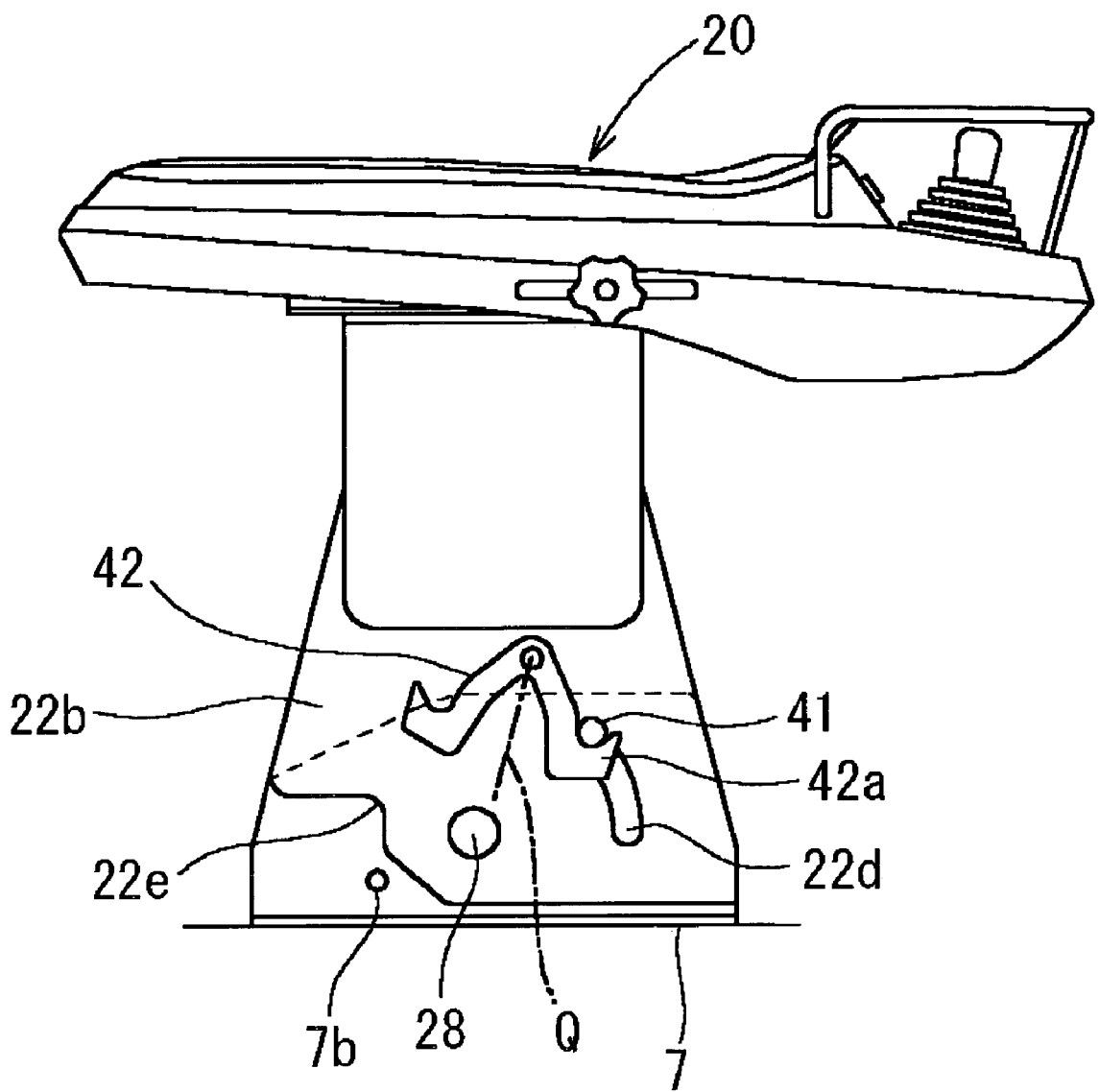
FIG. 10 is an explanation drawing illustrating an action of a locking member and a displacement of the armrest according to the third preferred embodiment of the present invention.
Figure 11:
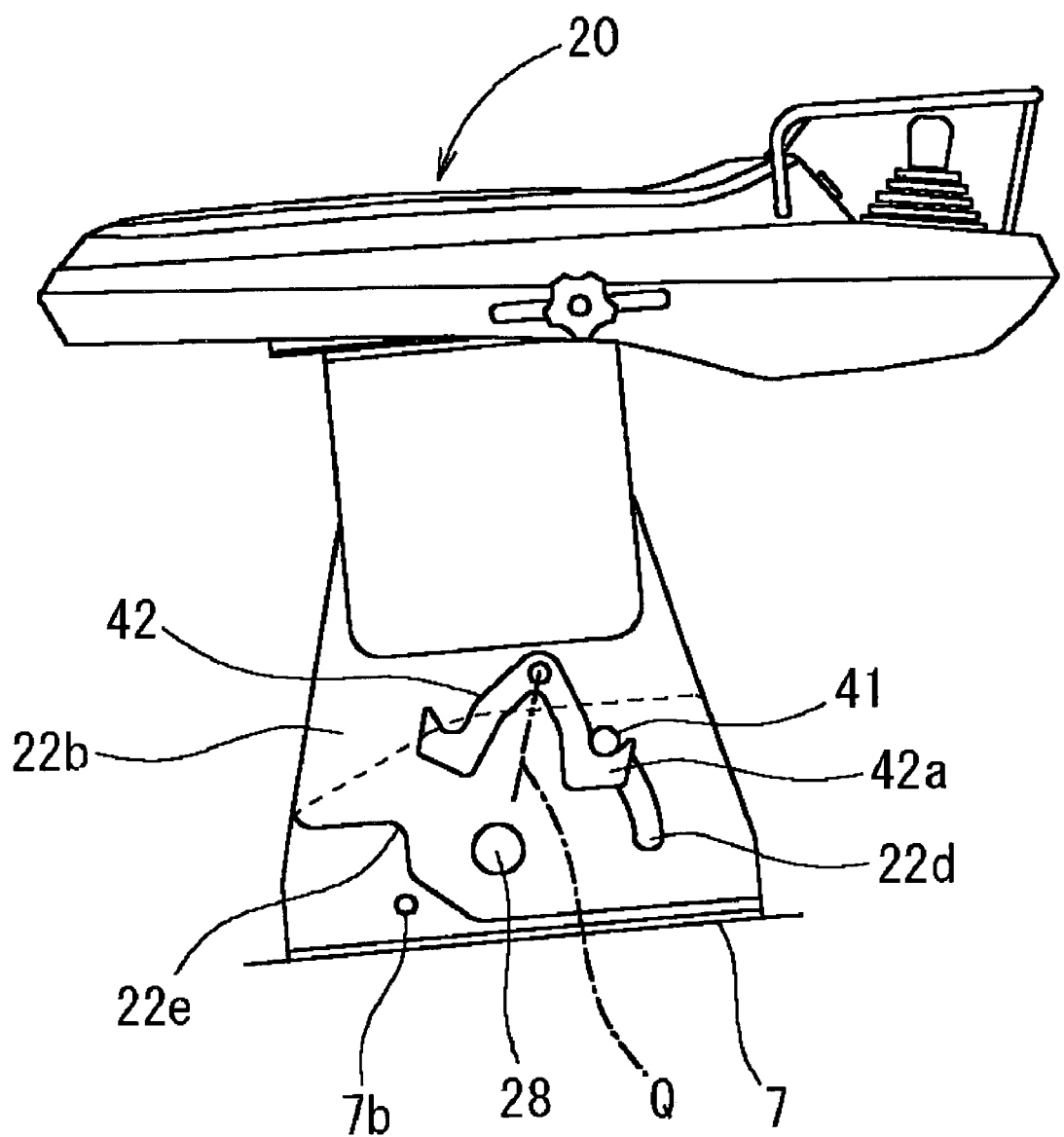
FIG. 11 is an explanation drawing illustrating an action of the locking member and a displacement of the armrest according to the third preferred embodiment of the present invention.
Figure 12:
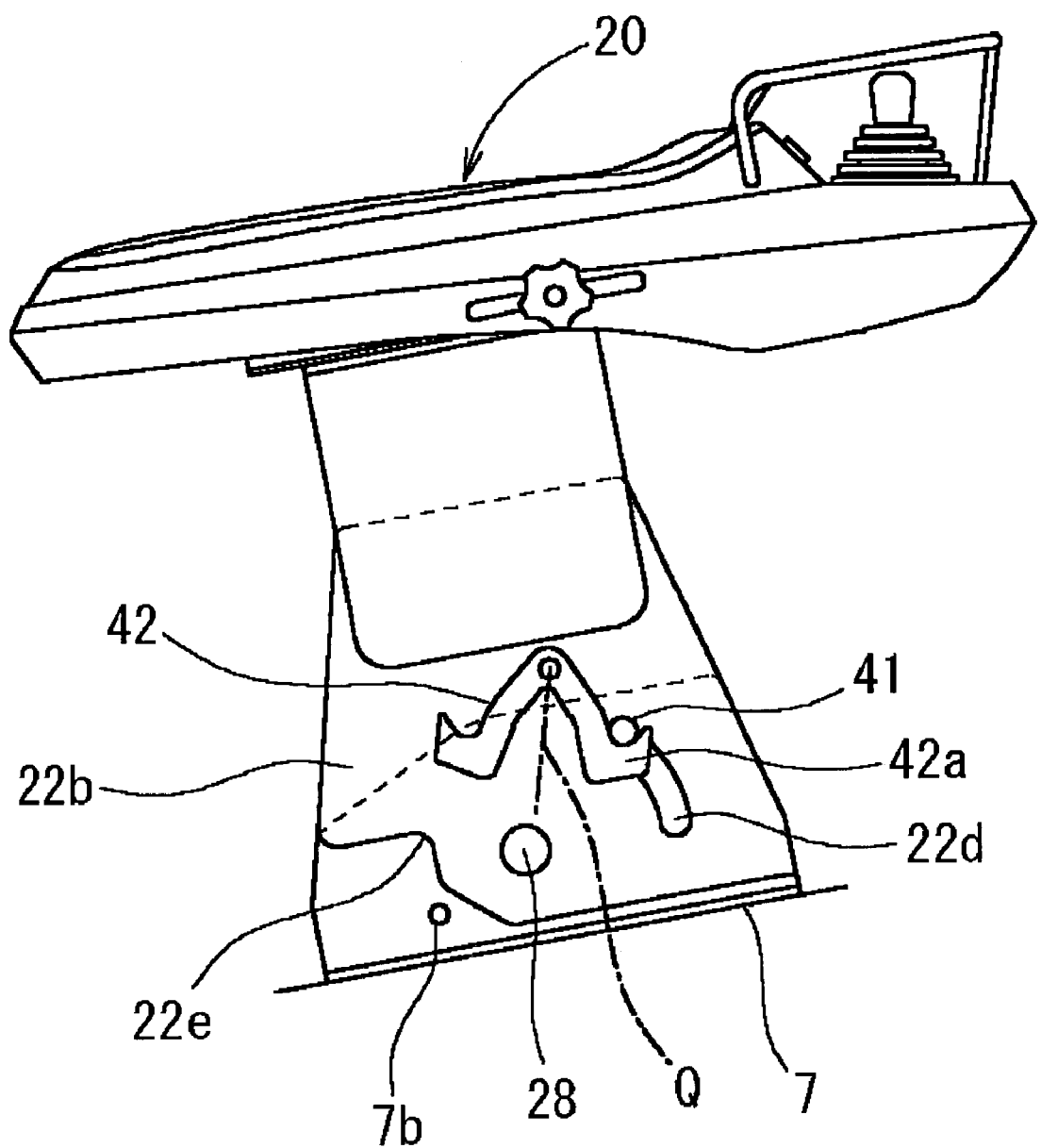
FIG. 12 is an explanation drawing illustrating an action of the locking member and a displacement of the armrest according to the third preferred embodiment of the present invention.
Figure 13:
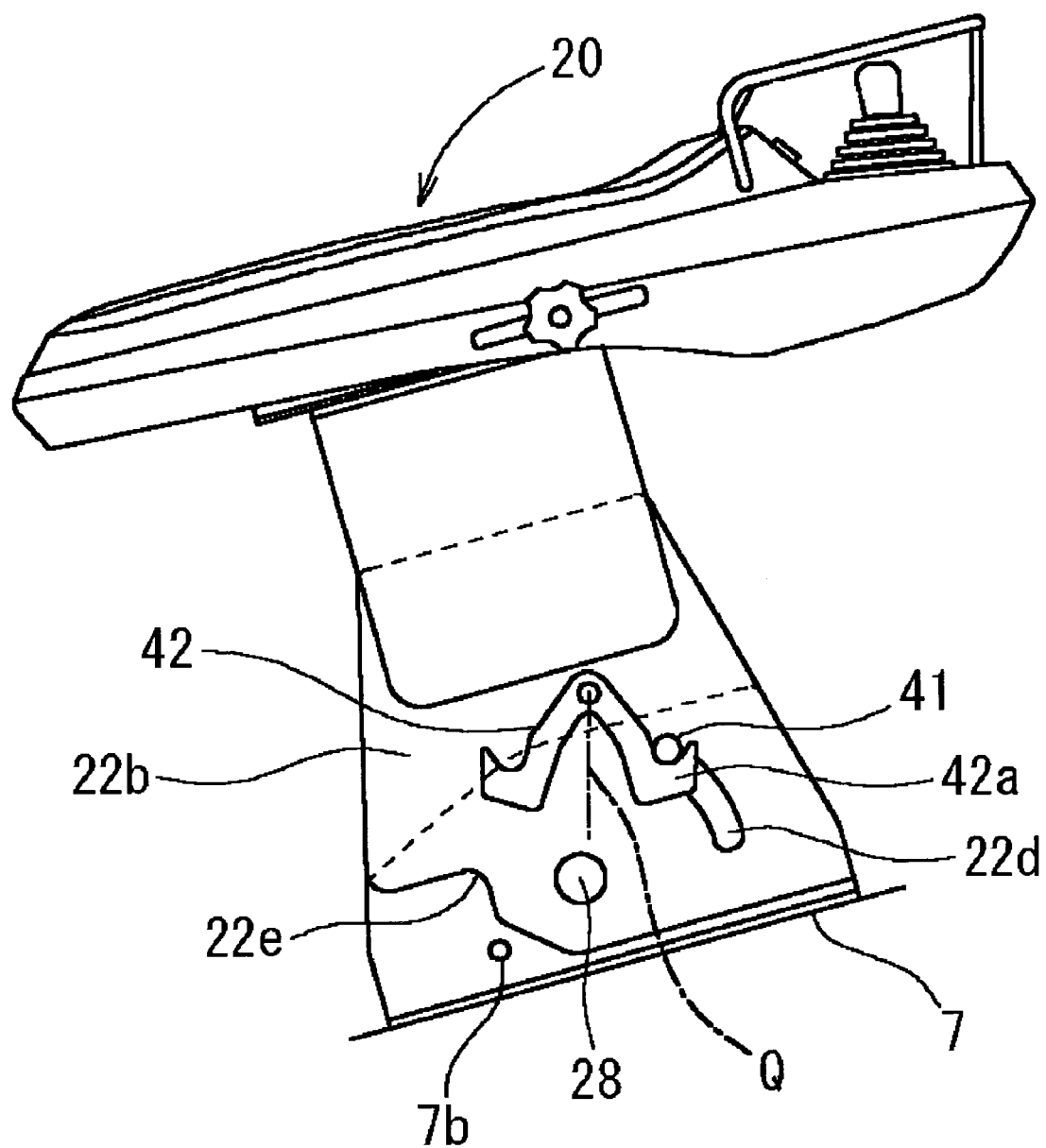
FIG. 13 is an explanation drawing illustrating an action of the locking member and a displacement of the armrest according to the third preferred embodiment of the present invention.

In the locking state as shown in FIG. 10, when the hood 2 is opened, the locking member 42 is integrally displaced with the locking pin 41 in a state that the locking member 42 is locked by the locking pin 41. Such an integral displacement is, as shown in FIGS. 11 through 13, a displacement having a direction that the locking member 42 becomes horizontal state (in a direction that an inclination angle of the dot chain line Q relative to the direction of gravity is reduced). After the locking member 42 becomes horizontal state (where the dot chain line Q corresponds to the direction of gravity), the locking member 42 pivots on the shaft 43 relative to the armrest 20 in such a manner that the locking member 42 maintains the horizontal state. Thereby, the hook 42a is unlocked from the locking pin 41.

Figure 14:
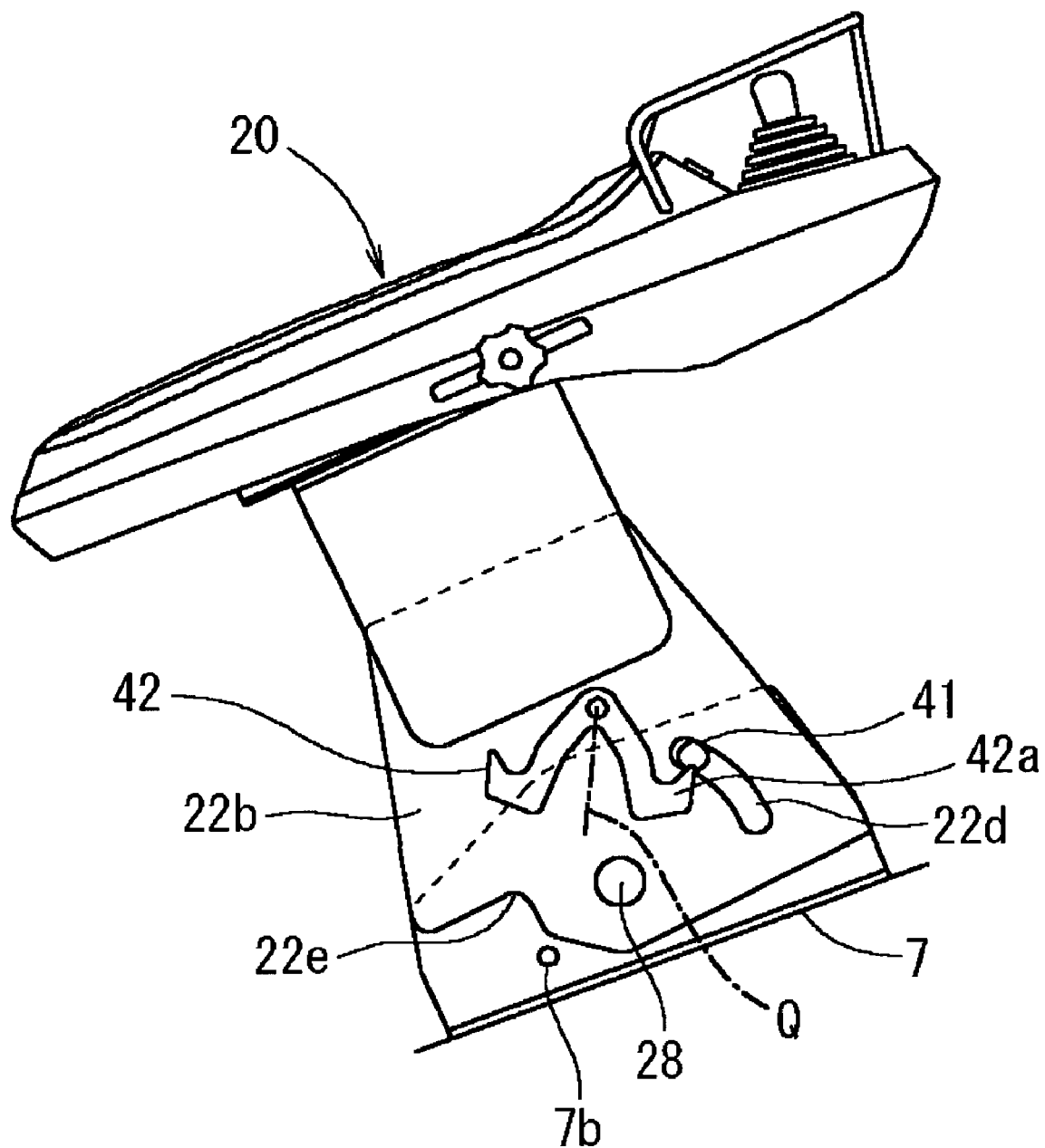
FIG. 14 is an explanation drawing illustrating an action of the locking member and a displacement of the armrest according to the third preferred embodiment of the present invention.
Figure 15:
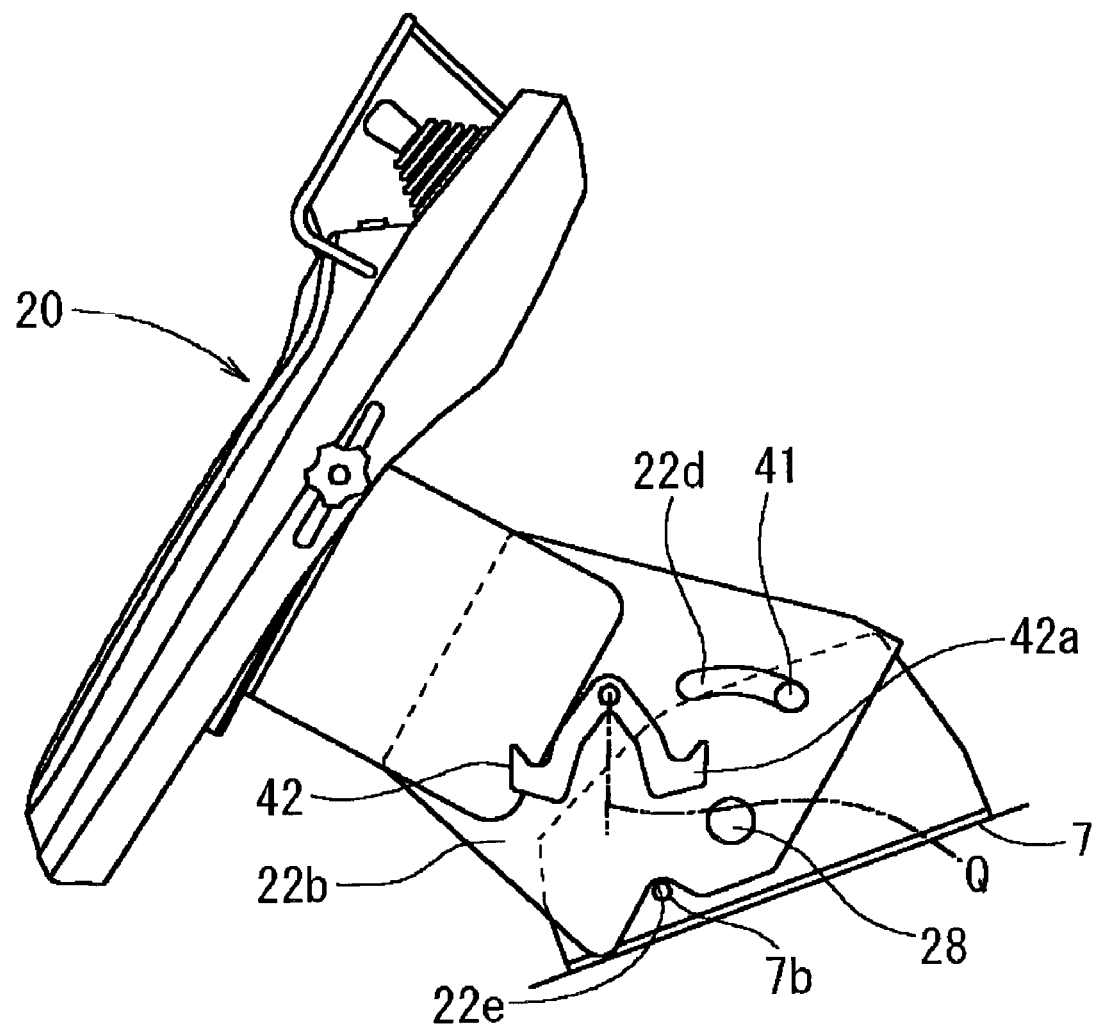
FIG. 15 is an explanation drawing illustrating an action of the locking member and a displacement of the armrest according to the third preferred embodiment of the present invention.

Meanwhile, the pivoting force generated due to the tare at the armrest 20 is applied to the armrest 20 itself rearward. Therefore, as the armrest 20 pivots rearward, as shown in FIG. 14, the locking member 42 pivots in such a manner that the hook 42a of the locking member 42 passes beneath the locking pin 41. Thus, the locking member 42 is unlocked and thereby the armrest 20 is pivoted rearward. The pivoting motion of the armrest 20 is regulated when the engaging portion 22e of the lower plate 22b contacts the stopper pin 7b. Thus, as shown in FIG. 15, the armrest 20 is displaced to the evacuating position.

Then, the hood 2 is opened in a state that the armrest 20 is held at the evacuating position. Therefore, the armrest 20 is moved without interfering with the guard portion 4b of the head guard 4.

Figure 16:
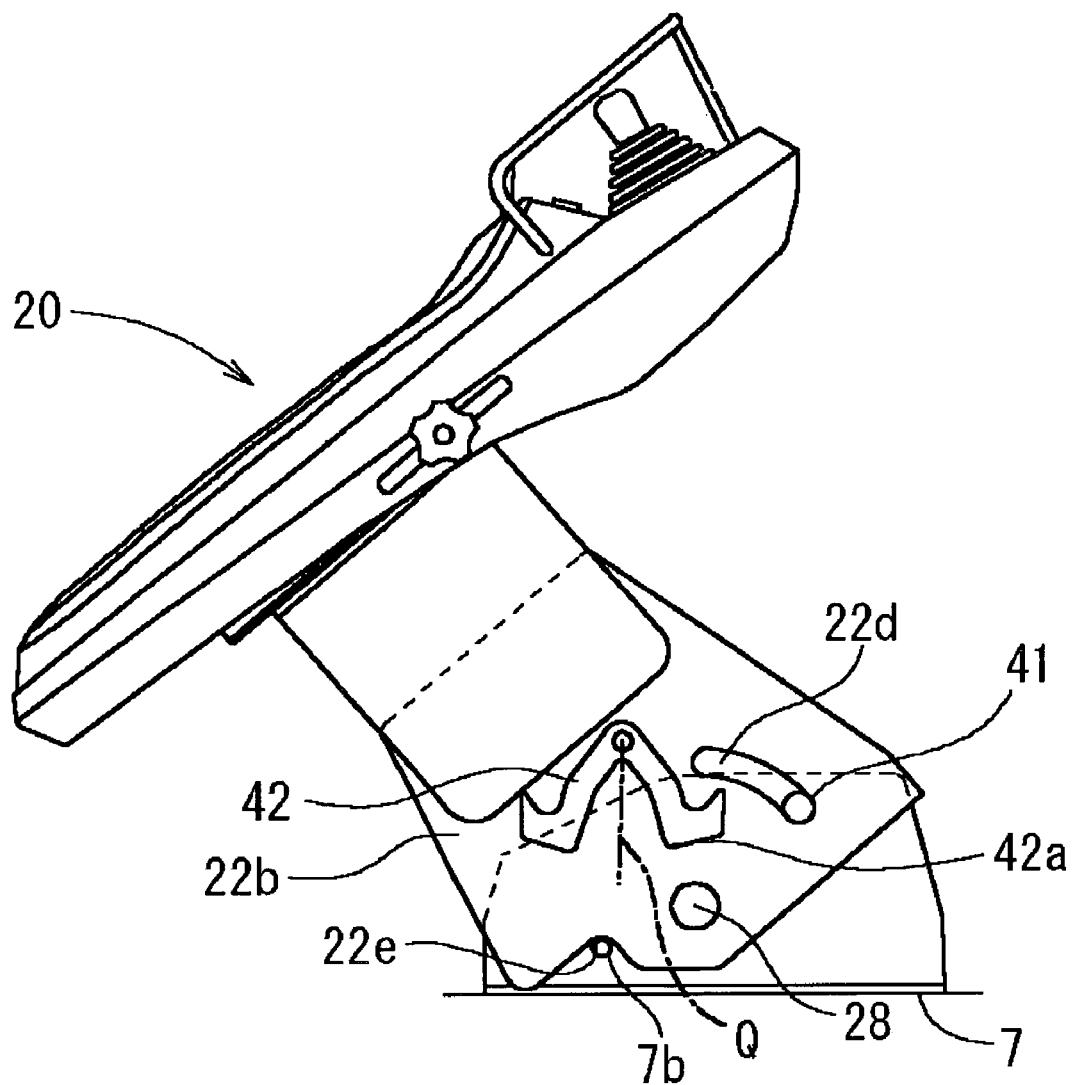
FIG. 16 is an explanation drawing illustrating an action of the locking member and a displacement of the armrest according to the third preferred embodiment of the present invention.
Figure 17:
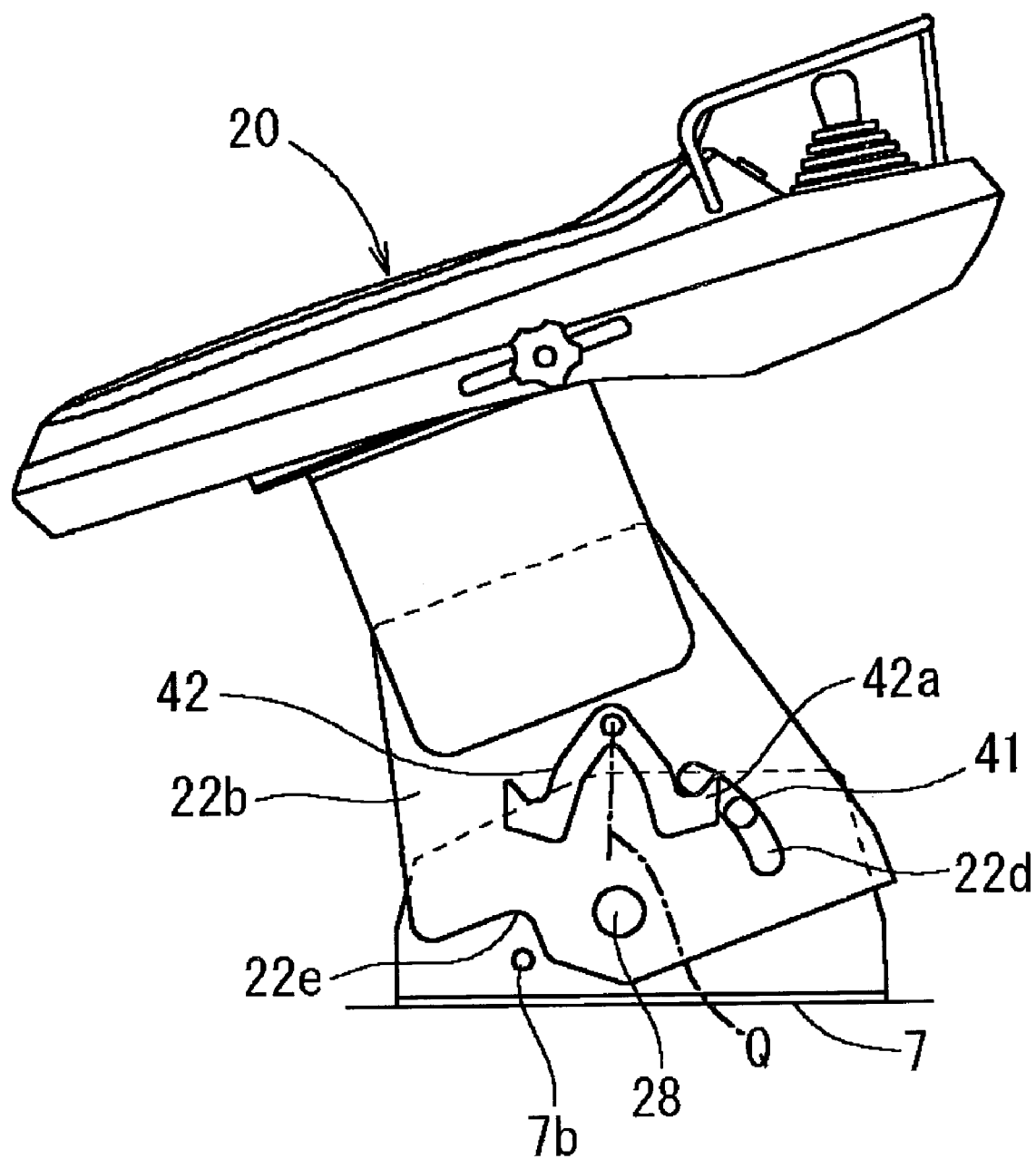
FIG. 17 is an explanation drawing illustrating an action of the locking member and a displacement of the armrest according to the third preferred embodiment of the present invention.
Figure 18:
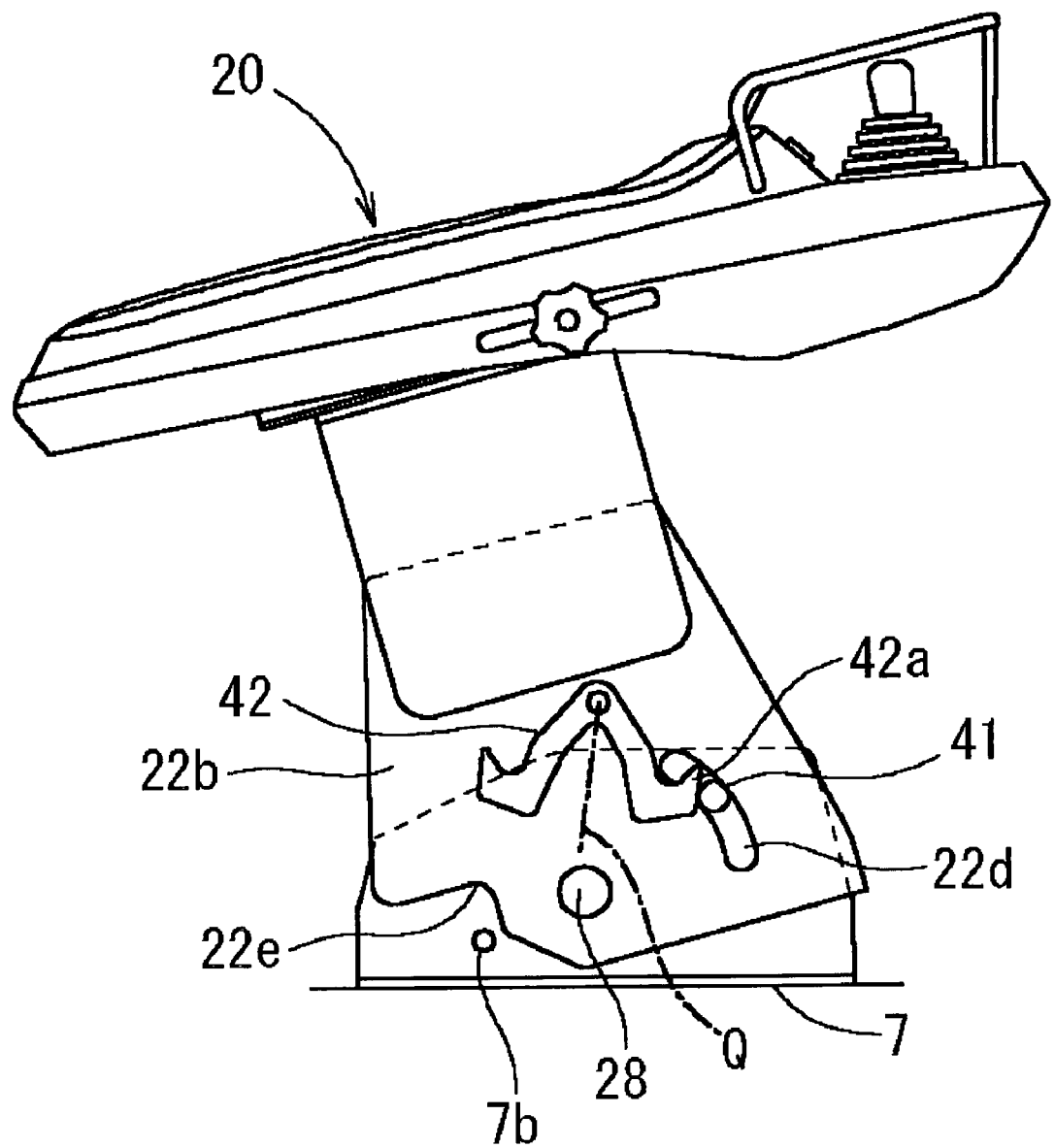
FIG. 18 is an explanation drawing illustrating an action of the locking member and a displacement of the armrest according to the third preferred embodiment of the present invention.
Figure 19:
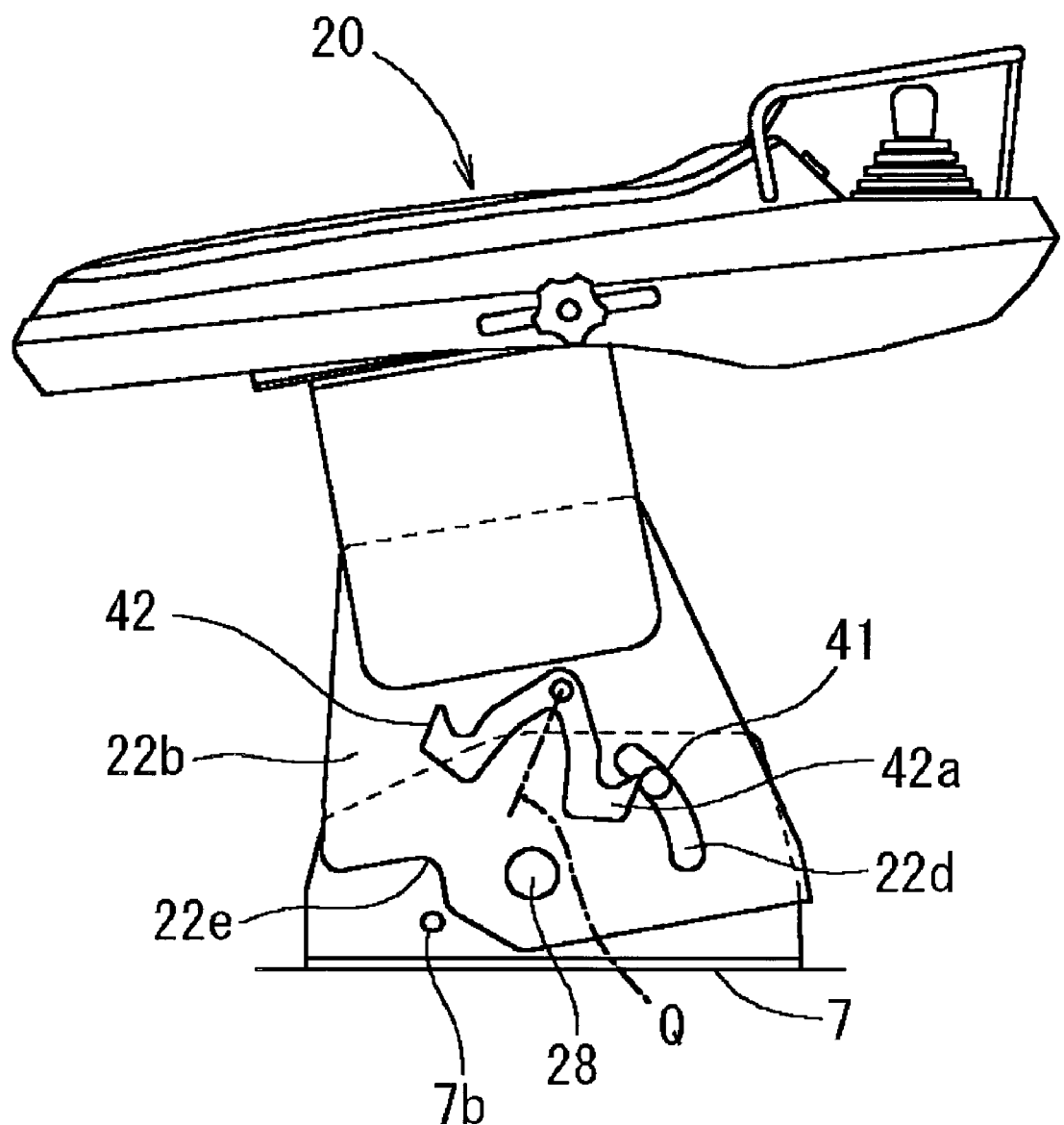
FIG. 19 is an explanation drawing illustrating an action of the locking member and a displacement of the armrest according to the third preferred embodiment of the present invention.

On the contrary, when the hood 2 is closed by hand, until the hood 2 is completely closed, as shown in FIG. 16, the armrest 20 is maintained at the evacuating position by its tare and the locking member 42 is also continuously maintained in a horizontal state. If pivoting force is applied to the armrest 20 frontward by hand, as shown in FIGS. 17 through 19, the locking member 42 is pivoted since the hook 42a is pushed by the locking pin 41. Then, at the same time when the locking pin 41 passes by the hook 42a, the hook 42a engages with the locking pin 41. Thereby, as shown in FIG. 10, the locking pin 41 and the hook 42a return to an initial state. That is, the armrest 20 is locked at the using position.

As constituted above, in the third embodiment, when the hood 2 is opened, the armrest 20 is displaced to the evacuating position only by unlocking the armrest 20 without any other operation. Therefore, interference between the armrest 20 and the guard portion 4b of the head guard 4 that is caused by forgetting to displace the armrest 20 to the evacuating position is avoided.

In the present invention, the following alternative implementations are also practiced.

In the above-described preferred embodiments, in the drawings, the operating member 9 is formed on the armrest 20. In alternative embodiments to the preferred embodiments, however, the operating member 9 is not formed on the armrest 20.

In the above-described preferred embodiments, the two shock absorbers 6 are used for absorbing the shock of the body 1. In alternative embodiments to the preferred embodiments, however, a single shock absorber 6 is used at one side of the body 1.

In the above-described preferred embodiments, in the constitution that the hood 2 is opened rearward, the head guard 4 is adopted as a part that is an obstacle of movement of the armrest 20 and that is provided with the vehicle. However, the obstacle is not limited to the head guard 4. In alternative embodiments to the preferred embodiments, the hood 2 is opened frontward. In this case, a part such as a steering and an instrument panel that is positioned at the front side of a driver's seat (or the operator's seat) can be the obstacle of the armrest 20.

In the above-described preferred embodiments, the armrest 20 is installed on the hood 2 through the bracket 7. In alternative embodiments to the preferred embodiments, however, the armrest 20 is installed on the seat 3 through the bracket 7.

In the locking mechanism 40 according to the third preferred embodiment, the working for unlocking the locking member 42 is performed by utilizing the tare of the locking member 42. In place of utilizing tare, in alternative embodiments to the preferred embodiment, the locking member 42 is unlocked by using an electric actuator that works based on the opening action of the hood 2.

Furthermore, in alternative embodiments to the preferred embodiment, an auxiliary locking member is provided at the side of the body 1 while the locking member 42 is continuously urged by a spring so as to be unlocked. In this case, when the hood 2 is closed, the auxiliary locking member contacts the locking member 42 and thereby pivots the locking member 42 against the spring so as to lock. Thus, the locking member 42 is engaged with the locking pin 41. When the hood 2 is opened, the operation for unlocking the locking member 42 is performed by the spring as the locking member 42 is separated from the auxiliary locking member.

In the above-described preferred embodiments, a forklift truck is adopted as the industrial vehicle. In alternative embodiments to the preferred embodiments, however, the industrial vehicle is not limited to the forklift truck.

Therefore, the present examples and embodiments are to be considered as illustrative and not restrictive and the invention is not to be limited to the details given herein but may be modified within the scope of the appended claims.

What is claimed is:

1. An industrial vehicle comprising:
   a body;
   a hood installed on or above the body, the hood having an end, the end being a pivotal axis around which the hood is pivoted so that the hood is opened and closed to the body; and
   an armrest coupled with a support plate installed on or above the hood, the armrest having a pivotal axis around which the armrest and the support plate are pivoted, as a whole, relative to the hood, the armrest having a first position and a second position, the armrest being displaced between the first position and the second position, wherein a position of the armrest is adjustable in a front-and-rear direction and in a vertical direction separately.

2. The industrial vehicle according to claim 1, further comprising a locking mechanism for locking and unlocking the armrest, the armrest being locked at the first position in a state that the hood is closed, the armrest being unlocked on the way to open the hood when the hood is opened, the armrest being displaced to the second position by its tare when the armrest is unlocked.

3. The industrial vehicle according to claim 1, further comprising an operating member for loading operation to operate an actuator for loading operation, the operating member being placed on the armrest.

4. The industrial vehicle according to claim 3, wherein the armrest further comprises a guard for surrounding the operating member.

5. The industrial vehicle according to claim 3, wherein the number of the operating members is plural, the operating members including a lift lever for raising and lowering a fork, and a tilt lever for tilting a mast frontward and rearward.

6. The industrial vehicle according to claim 5, wherein the operating members further includes an attachment lever for operating an attachment attached to a loading device.

7. The industrial vehicle according to claim 3, wherein the actuator has two types, the actuator including a lift cylinder and a tilt cylinder.

8. The industrial vehicle according to claim 1, further comprising a support member for supporting the armrest, the support member being installed on the hood.

9. An industrial vehicle comprising:
a body;
a hood installed on or above the body, the hood having an end, the end being a pivotal axis around which the hood is pivoted so that the hood is opened and closed to the body;
a seat installed on or above the hood; and
an armrest coupled with a support plate installed on or above the seat, the armrest having a pivotal axis around which the armrest and the support plate are pivoted, as a whole, relative to the seat, the armrest having a first position and a second position, the armrest being displaced between the first position and the second position, wherein a position of the armrest is adjustable in a front-and-rear direction and in a vertical direction separately.

10. The industrial vehicle according to claim 9, further comprising a locking mechanism for locking and unlocking the armrest, the armrest being locked at the first position in a state that the hood is closed, the armrest being unlocked on the way to open the hood when the hood is opened, the armrest being displaced to the second position by its tare when the armrest is unlocked.

11. The industrial vehicle according to claim 9, further comprising an operating member for loading operation to operate an actuator for loading operation, the operating member being placed on the armrest.

12. The industrial vehicle according to claim 11, wherein the armrest further comprises a guard for surrounding the operating member.

13. The industrial vehicle according to claim 9, further comprising a support member for supporting the armrest, the support member being installed on the seat.

14. The industrial vehicle according to claim 9, wherein the industrial vehicle is a forklift truck.

* * * * *